United States Patent
St. Rock et al.

(10) Patent No.: US 11,371,780 B2
(45) Date of Patent: *Jun. 28, 2022

(54) HEAT EXCHANGER WITH INTEGRAL FEATURES

(71) Applicant: Hamilton Sundstrand Corporation, Charlotte, NC (US)

(72) Inventors: Brian St. Rock, Andover, CT (US); Ram Ranjan, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/018,765

(22) Filed: Jun. 26, 2018

(65) Prior Publication Data

US 2019/0390914 A1    Dec. 26, 2019

(51) Int. Cl.
*F28D 19/00* (2006.01)
*F28D 7/00* (2006.01)
(Continued)

(52) U.S. Cl.
CPC .......... *F28D 7/0008* (2013.01); *F28F 9/0268* (2013.01); *F28F 19/006* (2013.01);
(Continued)

(58) Field of Classification Search
CPC .... F28F 7/02; F28F 9/02; F28F 9/0202; F28F 2250/06; F28F 19/006; F28D 7/0025; F28D 7/0033
See application file for complete search history.

(56) References Cited

U.S. PATENT DOCUMENTS

| 4,246,963 A | * | 1/1981 | Anderson | F28D 9/0062 138/32 |
| 4,749,032 A | * | 6/1988 | Rosman | F28D 9/0018 165/167 |

(Continued)

FOREIGN PATENT DOCUMENTS

| DE | 4333904 A1 | * | 3/1995 | ............... F28F 9/02 |
| EP | 3124906 A1 | | 2/2017 | |

(Continued)

OTHER PUBLICATIONS

Extended European Search Report for EP Application No. 19182587.6; Report dated Oct. 30, 2019 (8 pages).

(Continued)

*Primary Examiner* — Eric S Ruppert
(74) *Attorney, Agent, or Firm* — Cantor Colburn LLP

(57) ABSTRACT

A counterflow heat exchanger configured to exchange heat between a first fluid flow at a first pressure and a second fluid flow at a second pressure includes a first fluid inlet, a first fluid outlet fluidly coupled to the first fluid inlet via a core section, a second fluid inlet, and a second fluid outlet fluidly coupled to the second fluid inlet via the core section. The core section includes a plurality of first fluid passages configured to convey the first fluid flow from the first fluid inlet toward the first fluid outlet, and a plurality of second fluid passages configured to convey the second fluid flow from the second fluid inlet toward the second fluid outlet such that the first fluid flow exchanges thermal energy with the second fluid flow at the core section. Each first fluid passage of the plurality of first fluid passages has a circular cross-section.

13 Claims, 6 Drawing Sheets

(51) Int. Cl.
  *F28F 9/02* (2006.01)
  *F28F 21/06* (2006.01)
  *F28F 19/00* (2006.01)
  *F28D 21/00* (2006.01)

(52) U.S. Cl.
  CPC .... *F28F 21/062* (2013.01); *F28D 2021/0021* (2013.01); *F28F 2250/06* (2013.01)

(56) References Cited

U.S. PATENT DOCUMENTS

| | | | |
|---|---|---|---|
| 5,915,469 | A | 6/1999 | Abramzon et al. |
| 6,460,353 | B2 | 10/2002 | Udobot et al. |
| 9,022,319 | B2 | 5/2015 | Ji |
| 9,200,855 | B2 | 12/2015 | Kington et al. |
| 10,995,997 | B2 * | 5/2021 | St. Rock ............ F28F 9/0268 |
| 2013/0061617 | A1 | 3/2013 | Borghese et al. |
| 2014/0000841 | A1 | 1/2014 | Baker et al. |
| 2016/0116222 | A1 * | 4/2016 | Shedd ............ G06F 1/206 |
| | | | 165/166 |
| 2016/0131443 | A1 * | 5/2016 | Oliva ............ F28F 7/02 |
| | | | 165/164 |
| 2017/0089643 | A1 * | 3/2017 | Arafat ............ F28F 7/02 |
| 2017/0146305 | A1 * | 5/2017 | Kuczek ............ B23P 15/26 |
| 2017/0198976 | A1 | 7/2017 | Turney et al. |
| 2017/0198977 | A1 | 7/2017 | Herring et al. |
| 2017/0198979 | A1 | 7/2017 | St. Rock et al. |
| 2018/0038658 | A1 | 2/2018 | Eplee |

FOREIGN PATENT DOCUMENTS

| | | |
|---|---|---|
| EP | 3193126 A1 | 7/2017 |
| WO | 2016057443 A1 | 4/2016 |

OTHER PUBLICATIONS

European Search Report for European Application No. 19182587.6; dated Mar. 21, 2022; 4 pages.

* cited by examiner

HEAT EXCHANGER WITH INTEGRAL FEATURES

BACKGROUND

Exemplary embodiments pertain to the art of heat exchangers.

Heat exchangers are utilized in various applications to exchange thermal energy from a first fluid stream to a second fluid stream. For example, in an aircraft environmental control system (ECS), a heat exchanger is utilized to exchange thermal energy between a relatively low pressure, low temperature RAM airflow and a relatively high pressure, high temperature bleed air flow from a gas turbine engine compressor. Such thermal energy exchange cools the bleed air flow upstream of an air cycle machine of the ECS.

Further, in an ECS heat exchangers are utilized as condensers where relatively high temperature, humid air is cooled by a cold airstream. One such condenser is a "subfreezing" condenser, which utilizes an ice and/or snow-laden cold airstream to cool a hot airflow and condense water therefrom. The ice and snow pose significant risks for heat exchanger operation, as it may clog heat exchanger passages, increasing pressure losses and diminishing heat exchanger and ECS efficiency and performance.

BRIEF DESCRIPTION

In one embodiment, a counterflow heat exchanger configured to exchange thermal energy between a first fluid flow at a first pressure and a second fluid flow at a second pressure less than the first pressure includes a first fluid inlet, a first fluid outlet fluidly coupled to the first fluid inlet via a core section, a second fluid inlet, and a second fluid outlet fluidly coupled to the second fluid inlet via the core section. The core section includes a plurality of first fluid passages configured to convey the first fluid flow from the first fluid inlet toward the first fluid outlet, and a plurality of second fluid passages configured to convey the second fluid flow from the second fluid inlet toward the second fluid outlet such that the first fluid flow exchanges thermal energy with the second fluid flow at the core section. Each first fluid passage of the plurality of first fluid passages has a circular cross-section.

Additionally or alternatively, in this or other embodiments the plurality of first fluid passages are connected to the plurality of second fluid passages via one or more web portions.

Additionally or alternatively, in this or other embodiments the one or more web portions define at least a portion of the passage wall of the plurality of first fluid passages.

Additionally or alternatively, in this or other embodiments a first inlet header is located between the first fluid inlet and the core section. The first inlet header includes one or more first inlet vanes to direct the first fluid flow from the first fluid inlet to the plurality of first fluid passages.

Additionally or alternatively, in this or other embodiments the one or more first inlet vanes extend across the first inlet header to structurally support the first inlet header.

Additionally or alternatively, in this or other embodiments a first outlet header is located between the core section and the first fluid outlet. The first outlet header includes one or more first outlet vanes to direct the first fluid flow from the plurality of first fluid passages to the first fluid outlet.

Additionally or alternatively, in this or other embodiments the one or more first outlet vanes extend across the first outlet header to structurally support the first outlet header.

Additionally or alternatively, in this or other embodiments a second inlet header is located between the second fluid inlet and the core section. The second inlet header includes one or more second inlet vanes to direct the second fluid flow from the second fluid inlet to the plurality of second fluid passages.

Additionally or alternatively, in this or other embodiments a second outlet header is located between the core section and the second fluid outlet. The second outlet header includes one or more second outlet vanes to direct the second fluid flow from the plurality of second fluid passages to the second fluid outlet.

Additionally or alternatively, in this or other embodiments a first flow direction of the first fluid flow through the first fluid inlet is nonparallel to the first flow direction of the first fluid flow through the plurality of first fluid passages.

Additionally or alternatively, in this or other embodiments a second flow direction of the second fluid flow through the second fluid inlet is nonparallel to the second flow direction of the second fluid flow through the plurality of second fluid passages.

Additionally or alternatively, in this or other embodiments a first flow direction of the first fluid flow through the plurality of first fluid passages is opposite a second flow direction of the second fluid flow through the plurality of second fluid passages.

Additionally or alternatively, in this or other embodiments the heat exchanger is formed from a polymeric material.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
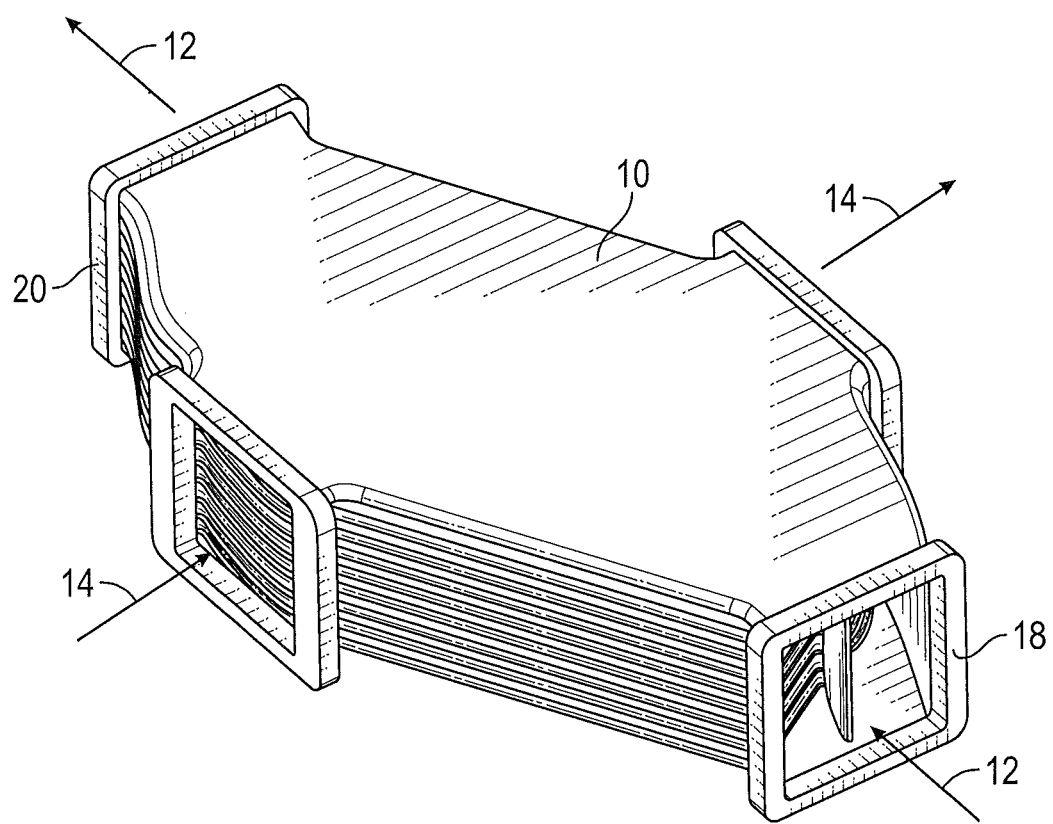
FIG. 1 is a perspective view of an embodiment of a heat exchanger.

Referring now to FIG. 1, illustrated is a schematic view of an embodiment of a heat exchanger 10. The heat exchanger 10 facilitates an exchange of thermal energy between a first fluid flow 12 and a second fluid flow 14 directed through the heat exchanger 10. In some embodiments, the first fluid flow 12 is a relatively high temperature, high pressure fluid flow such as a bleed airflow from a compressor of a gas turbine engine. Further, in some embodiments the second fluid flow 14 is a relatively low temperature, low pressure fluid flow such as RAM airflow for use by an aircraft environmental control system (not shown).

Figure 2A:
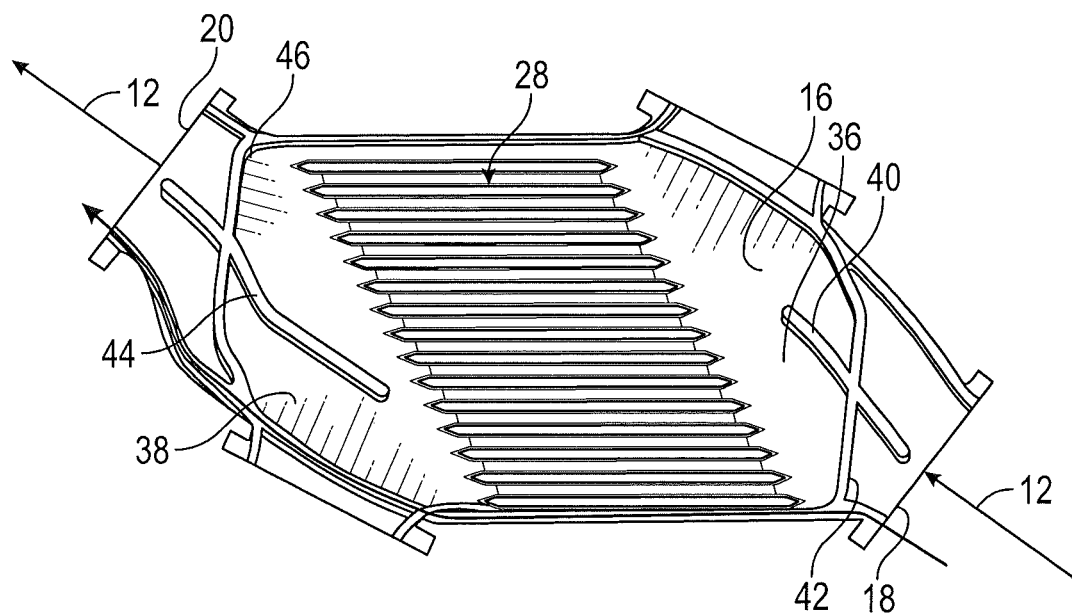
FIG. 2A is a plan view of a first flowpath of an embodiment of a heat exchanger.
Figure 2B:
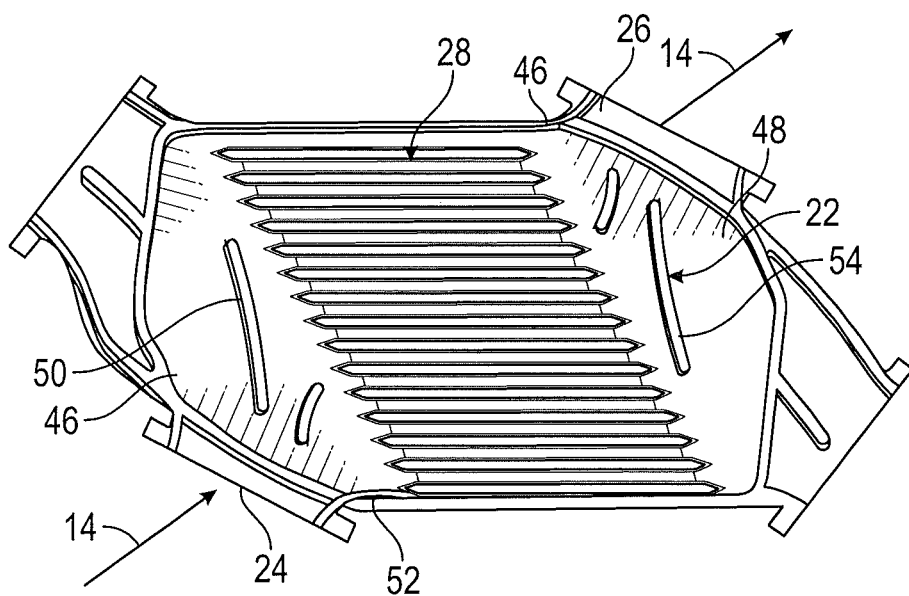
FIG. 2B is a plan view of a second flow path of an embodiment of a heat exchanger.

As shown in FIG. 1 and in FIG. 2A, the heat exchanger 10 includes a first fluid flow path 16 along which the first fluid flow 12 is directed through the heat exchanger 10 from a first inlet 18 to a first outlet 20. Similarly, as shown in FIGS. 1 and 2B, the heat exchanger 10 includes a second fluid flow path 22 along which the second fluid flow 14 is directed from a second inlet 24 to a second outlet 26. The heat exchanger 10 is a counter-flow heat exchanger 10 such that at a core section 28 of the heat exchanger 10, the first fluid flow 12 and the second fluid flow 14 are flowing in substantially opposite directions.

Figure 3:
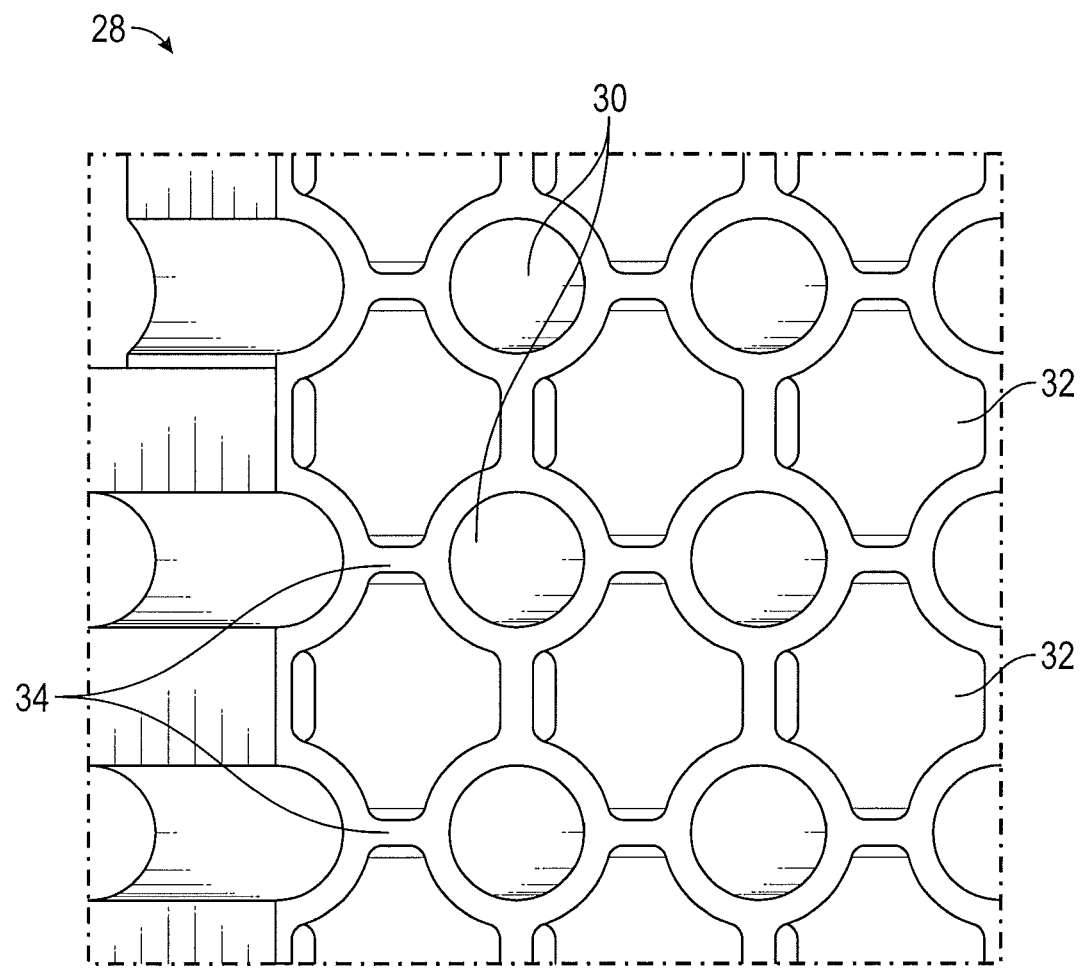
FIG. 3 is a partial cross-sectional view of an embodiment of a core section of a heat exchanger.

A cross-sectional view of a portion of the core section 28 of the heat exchanger 10 is illustrated in FIG. 3. The core section 28 includes a plurality of first passages 30 to convey the first fluid flow 12 therethrough, and a plurality of second passages 32 to convey the second fluid flow 14 therethrough. The first fluid passages 30 are circular in cross-section. This allows the first fluid passages 30 to convey the high pressure first fluid flow 12, and to allow for the use of lower strength polymeric materials in place of the traditional metal materials in forming the first fluid passages 30, the second fluid passages 32 and the core section 28. For some materials the first fluid passages may be any polygonal shape that maximizes primary heat transfer area between the first and the second fluid. The second fluid passages 32 are located between adjacent first fluid passages 30 and are separated from the first fluid passages 30 by web sections 34, which at least partially form walls of the first fluid passages 30. While in some embodiments, the second fluid passages 32 may have a circular cross sections, the second fluid passages 32 may have other cross-sectional shapes due to the lower pressure of the second fluid flow 14.

Referring again to FIG. 2A, a first inlet manifold 36 is located between the first inlet 18 and the core section 28, and a first outlet manifold 38 is located between the core section 28 and the first outlet 20. The first inlet manifold 36 is configured to minimize contraction losses at transition area between the first inlet manifold 36 and the first fluid passages 30 of the core section 28. This includes aerodynamic design of the leading edges in the header section, optimized header hydraulic diameter to balance pressure loss and the core, etc. The first inlet manifold 36 includes one or more first inlet vanes 40 located between the first inlet 18 and the core section 28 to distribute the first fluid flow 12 to the plurality of first fluid passages 30. While the embodiment of FIG. 2A shows one first inlet vane 40, it is to be appreciated that that other quantities of first inlet vanes 40, such as 2, or 3 or more first inlet vanes 40, may be utilized to distribute the first fluid flow 12 in a selected way. The quantity and arrangement of first inlet vanes 40 may depend on, for example, a first inlet angle 42 between the first inlet 18 and the core section 28. These vanes are also designed to provide structural strength in the header/manifold section of the heat exchangers. Additionally good flow distribution with minimal flow pressure loss can also be attained by optimizing the outer mold line shapes of the inlet and outlet manifolds. Inlet and outlet manifolds could have different designs of the internal vanes and their outer mold line shapes for enhancing flow distribution and reducing pressure loss.

Similarly, the first outlet manifold 38 includes one or more first outlet vanes 44 located between the core section 28 and the first outlet 20 to smoothly direct the first fluid flow 12 from the core section 28 to the first outlet 20, minimizing losses. While the embodiment of FIG. 2A shows one first outlet vane 44, it is to be appreciated that that other quantities of first outlet vanes 44 such as 2, or 3 or more first outlet vanes 44, may be utilized to direct the first fluid flow 12 in a selected way. The quantity and arrangement of first outlet vanes 44 may depend on, for example, a first outlet angle 46 between the first outlet 20 and the core section 28.

Referring again to FIG. 2B, a second inlet manifold 46 is located between the second inlet 24 and the core section 28, and a second outlet manifold 48 is located between the core section 28 and the second outlet 26. The second inlet manifold 46 is configured to minimize contraction losses at transition area between the second inlet manifold 46 and the second fluid passages 32 of the core section 28. This is achieved by smoothly lofting the flow cross-section from the core channels, e.g., circular tubes, to a rectangular slot in the headers. This transition region is designed such that flow separation and blockage is minimized in the transition region. One way to achieve that is maintaining constant flow cross sectional areas for both flow streams in the transition region. The second inlet manifold 46 includes one or more second inlet vanes 50 located between the second inlet 24 and the core section 28 to distribute the second fluid flow 14 to the plurality of second fluid passages 32. While the embodiment of FIG. 2B shows one second inlet vane 50, it is to be appreciated that that other quantities of second inlet vanes 50, such as 2, or 3 or more second inlet vanes 50, may be utilized to distribute the second fluid flow 14 in a selected way. The quantity and arrangement of second inlet vanes 50 may depend on, for example, a second inlet angle 52 between the second inlet 24 and the core section 28.

Similarly, the second outlet manifold 48 includes one or more second outlet vanes 54 located between the core section 28 and the second outlet 26 to smoothly direct the second fluid flow 14 from the core section 28 to the second outlet 26, minimizing losses. While the embodiment of FIG. 2B shows one second outlet vane 54, it is to be appreciated that that other quantities of second outlet vanes 54 such as 2, or 3 or more second outlet vanes 54, may be utilized to direct the second fluid flow 14 in a selected way. The quantity and arrangement of second outlet vanes 54 may depend on, for example, a second outlet angle 56 between the second outlet 26 and the core section 28.

While the vanes 40, 44, 50 and 54 are included to direct the fluid flows 12, 14 through the heat exchanger 10 smoothly and efficiently, the vanes 40, 44, 50 and 54 also provide structural rigidity to the heat exchanger 10. This further enables the use of polymeric materials such as epoxy resins, polyurethane materials, or the like in formation of the heat exchanger 10.

Figure 4:
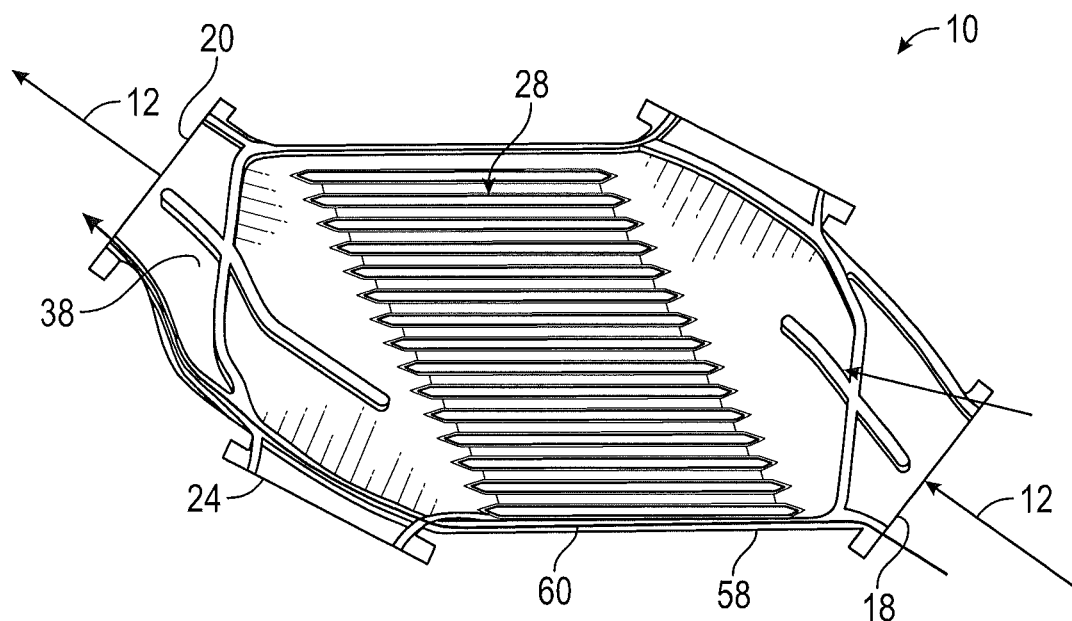
FIG. 4 is a plan view of an inlet heating arrangement of a heat exchanger.
Figure 5:
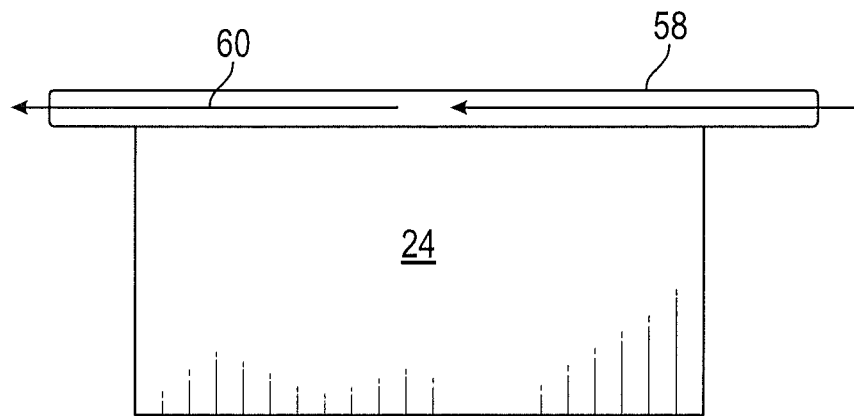
FIG. 5 is a cross-sectional view of an inlet heating arrangement of a heat exchanger.

Referring now to FIGS. 4 and 5, as stated above, the ingestion of ice and/or snow through the second inlet 24 reduces performance of the heat exchanger 10 by, for example, clogging the second inlet 24 and/or the second fluid passages 32. To enable ice-free operation of the heat exchanger 10, the heat exchanger 10 includes a heating apparatus located at the second inlet 24. More particularly, the heat exchanger 10 includes one or more bypass passages 58 extending from the first inlet 18 toward the second inlet 24. The bypass passages 58 direct a bypass portion 60 of the first fluid flow 12 toward the second inlet 24, bypassing the core section 28. As the bypass portion 60 passes the second inlet 24, the second inlet 24 is heated via conduction. The heated second inlet 24 reduces ice and/or snow ingestion at the second inlet 24, thus improving performance of the heat exchanger 10. After passing the second inlet 24, the bypass portion 60 is directed through the first outlet 20 via the first outlet manifold 38. While in the embodiment illustrated, the flow of the bypass portion 60 is constant, in other embodiments the flow of the bypass portion 60 may be modulated via, for example, one or more valves (not shown) operable to open or close directing flow through the bypass passages 58 when, for example, the second fluid flow 14 is at a sub-freezing temperature.

Figure 6:
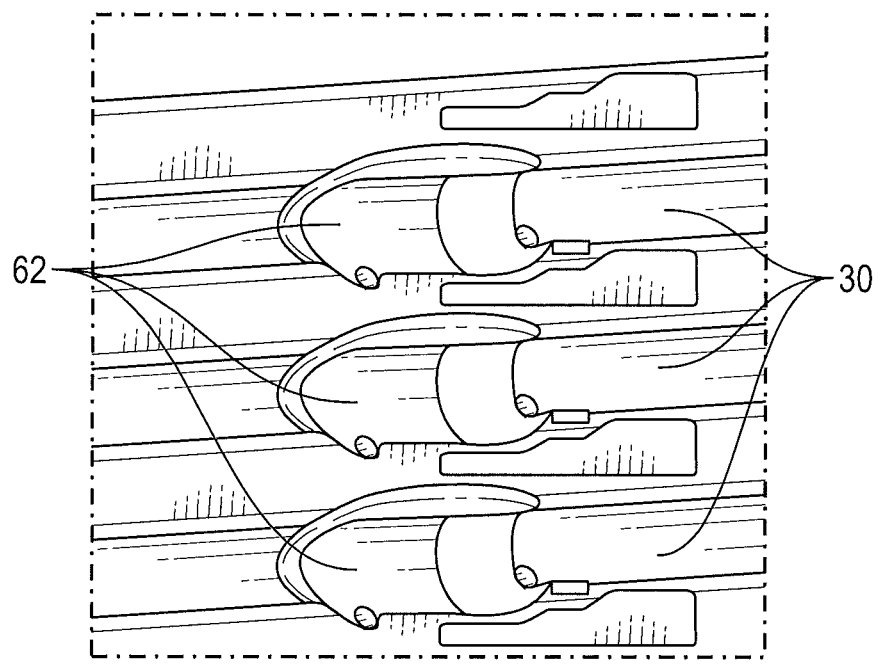
FIG. 6 is a cross-sectional view of a fluid passage drain arrangement of a heat exchanger.
Figure 7:
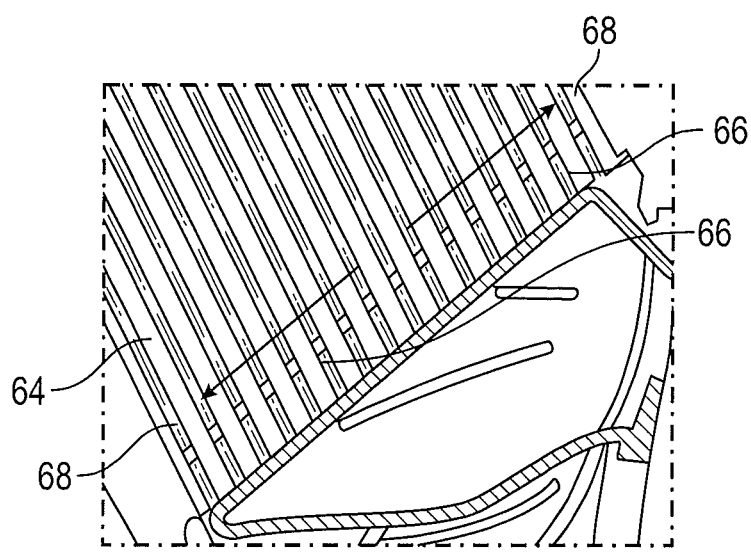
FIG. 7 is another cross-sectional view of a fluid passage drain arrangement of a heat exchanger.
Figure 8:
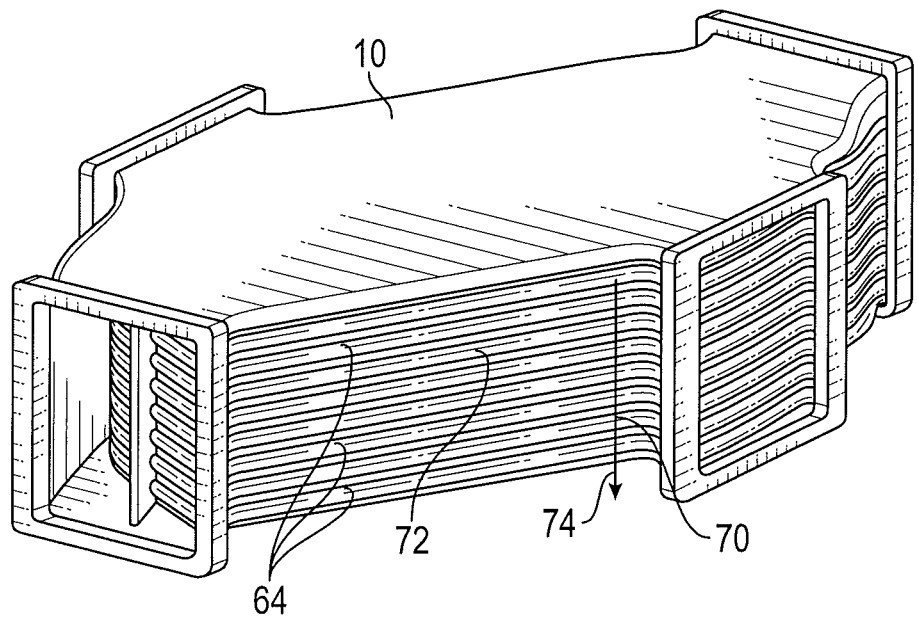
FIG. 8 is an end view of a fluid passage drain arrangement of a heat exchanger.

Referring now to FIGS. 6-8, during operating of the heat exchanger 10 condensation may form on an interior on each of the first fluid passages 30, due to the high relative humidity of the first fluid flow 12. It is desired to remove the condensation from the heat exchanger 10 such that the condensation does not proceed through the first outlet 20. As shown in FIG. 6, the first fluid passages 30 are provided with scupper drains 62 into which the condensation is urged by flow of the first fluid flow 12 through the first fluid passages 30. In some embodiments, the scupper drains 62 comprise openings or notches in the first fluid passages 30.

As shown in FIG. 7, the scupper drains 62 of the first fluid passages 30 of each passage layer 64 of the core section 28 are connected by a layer drain 66. The layer drain 66 collects the condensation from the scupper drains 62 of the passage layer 64 and directs the condensation to a layer end 68. As shown in FIG. 8, a core drain 70 is located at the layer end 68, to collect the condensation from the layer drains 66 and drain the condensation downwardly along an outer surface 72 out the heat exchanger 10. The core drain 70 may be, for example a tubular element extending along the outer surface 72, or alternatively may be a notch or the like in the outer surface 72 of the heat exchanger 10. The core drain 70 includes a drain outlet 74 through which the condensation exits the heat exchanger 10.

Figure 9:
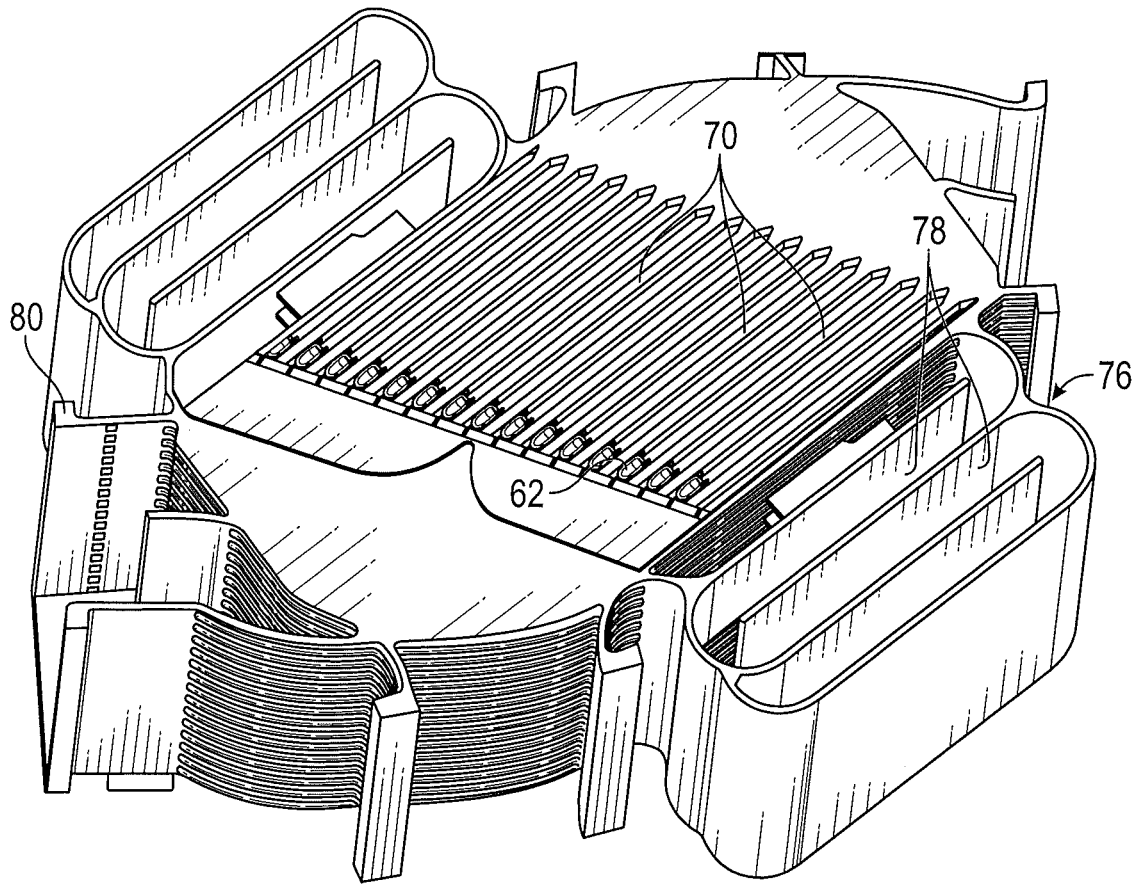
FIG. 9 is another view of a fluid passage drain arrangement of a heat exchanger.

It is expected that the condensate flowing through the scupper drains 62 will entrain some air flow from the bulk flow. Hence, a water removal and air re-entrainment apparatus is utilized. Once the condensate mixture comes out of the HX core through the core drains 70, it enters a water removal chamber 76, shown in FIG. 9. The water removal chamber 76 includes multi-passage tortuous flow channels 78 which slow down the air-water mixture such that water/condensate flows down due to gravity into a water reservoir. This reservoir is ultimately connected to the drain outlet 74 from which the condensate can freely flow out and may be utilized in other parts of the ECS 10. The remaining air is re-entrained back into the HX main flow path through re-entrainment holes 80 that are located in the HX outlet manifold. Some local features near the re-entrainment holes 80 can be added to decrease the local flow static pressure such that the overflow air can be effectively re-entrained into the main flow stream. These features reduce the air leakage associated with water separation during ECS 10 operation.

With this drainage arrangement, a separate water removal system downstream of the heat exchanger 10 is not necessary, which is a significant savings in component cost and volume. Further, the heat exchanger 10 features disclosed herein may be integrally formed with polymeric materials via molding or additive manufacturing methods. Further, the use of polymeric materials has additional benefits in reduced weight, improved corrosion resistance, low surface energy to assist in ice removal, and reduction in raw material costs, as compared to heat exchangers formed with a traditional metal construction.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A counterflow heat exchanger configured to exchange thermal energy between a first fluid flow at a first pressure and a second fluid flow at a second pressure less than the first pressure, comprising:
   a first fluid inlet;
   a first fluid outlet fluidly coupled to the first fluid inlet via a core section;
   a second fluid inlet;
   a second fluid outlet fluidly coupled to the second fluid inlet via the core section;
   the core section including:
      a plurality of first fluid passages configured to convey the first fluid flow from the first fluid inlet toward the first fluid outlet; and
      a plurality of second fluid passages configured to convey the second fluid flow from the second fluid inlet toward the second fluid outlet such that the first fluid flow exchanges thermal energy with the second fluid flow at the core section; the plurality of first fluid passages and the plurality of second fluid passages arranged in a plurality of passage layers;
   one or more first inlet vanes disposed between the first fluid inlet and the plurality of first fluid passages to direct the first fluid flow from the first fluid inlet to the plurality of first fluid passages, a gap present between each first inlet vane and the plurality of first fluid passages, wherein a first inlet vane end closest to the first fluid passages is non-parallel to the first fluid passages; and
   one or more second inlet vanes disposed between the second fluid inlet and the plurality of second fluid passages to direct the second fluid flow from the second fluid inlet to the plurality of second fluid passages, a gap present between each second inlet vane and the plurality of second fluid passages, wherein a second inlet vane end closest to the second fluid passages is non-parallel to the second fluid passages;
   one or more bypass passages extending from the first fluid inlet toward the second fluid inlet, bypassing the core section, the one or more bypass passages configured to direct a bypass portion of the first fluid flow from the first fluid inlet past the second fluid inlet, the one or more bypass passages extending across the second fluid inlet, the second fluid inlet and the one or more bypass passages spaced apart from the core section by a second fluid inlet manifold fluidly connecting the second fluid inlet to the core section;

wherein each first fluid passage of the plurality of first fluid passages has a circular cross-section;

wherein a first inlet vane of the one or more first inlet vanes and a second inlet vane of the one or more second inlet vanes each span the plurality of passage layers;

wherein a first flow direction of the first fluid flow into the first fluid inlet is nonparallel to a second flow direction of the second fluid flow into the second fluid inlet.

2. The counterflow heat exchanger of claim 1, wherein the plurality of first fluid passages are separated from the plurality of second fluid passages via one or more web portions.

3. The counterflow heat exchanger of claim 2, wherein the one or more web portions define at least a portion of the passage wall of the plurality of first fluid passages.

4. The counterflow heat exchanger of claim 1, further comprising a first inlet header disposed between the first fluid inlet and the core section, the one or more first inlet vanes disposed in the first inlet header.

5. The counterflow heat exchanger of claim 4, wherein the one or more first inlet vanes extend across the first inlet header to structurally support the first inlet header.

6. The counterflow heat exchanger of claim 1, further comprising a first outlet header disposed between the core section and the first fluid outlet, the first outlet header including one or more first outlet vanes to direct the first fluid flow from the plurality of first fluid passages to the first fluid outlet.

7. The counterflow heat exchanger of claim 6, wherein the one or more first outlet vanes extend across the first outlet header to structurally support the first outlet header.

8. The counterflow heat exchanger of claim 1, further comprising a second inlet header disposed between the second fluid inlet and the core section, the or more second inlet vanes disposed in the second inlet header.

9. The counterflow heat exchanger of claim 1, further comprising a second outlet header disposed between the core section and the second fluid outlet, the second outlet header including one or more second outlet vanes to direct the second fluid flow from the plurality of second fluid passages to the second fluid outlet.

10. The counterflow heat exchanger of claim 1, wherein a first flow direction of the first fluid flow through the first fluid inlet is nonparallel to the first flow direction of the first fluid flow through the plurality of first fluid passages.

11. The counterflow heat exchanger of claim 1, wherein a second flow direction of the second fluid flow through the second fluid inlet is nonparallel to the second flow direction of the second fluid flow through the plurality of second fluid passages.

12. The counterflow heat exchanger of claim 1, wherein a first flow direction of the first fluid flow through the plurality of first fluid passages is opposite a second flow direction of the second fluid flow through the plurality of second fluid passages.

13. The counterflow heat exchanger of claim 1, wherein the heat exchanger is formed from a polymeric material.

* * * * *